(12) United States Patent
Oshitani et al.

(10) Patent No.: US 7,694,529 B2
(45) Date of Patent: Apr. 13, 2010

(54) REFRIGERANT CYCLE DEVICE WITH EJECTOR

(75) Inventors: Hiroshi Oshitani, Toyota (JP);
Hirotsugu Takeuchi, Nagoya (JP);
Yoshiaki Takano, Kosai (JP); Mika Gocho, Obu (JP)

(73) Assignee: Denso Corporation, Kariya (JP)

( * ) Notice: Subject to any disclaimer, the term of this patent is extended or adjusted under 35 U.S.C. 154(b) by 210 days.

(21) Appl. No.: 11/891,174

(22) Filed: Aug. 9, 2007

(65) Prior Publication Data

US 2008/0034786 A1   Feb. 14, 2008

(30) Foreign Application Priority Data

Aug. 11, 2006   (JP)   ............................. 2006-219475

(51) Int. Cl.
*F25B 1/06*   (2006.01)
(52) U.S. Cl. .......................................... 62/500; 62/504
(58) Field of Classification Search ................ 62/500, 62/504, 511, 513
See application file for complete search history.

(56) References Cited

U.S. PATENT DOCUMENTS

| | | | |
|---|---|---|---|
| 6,837,069 B2 * | 1/2005 | Takeuchi et al. | 62/500 |
| 7,059,150 B2 * | 6/2006 | Komatsu et al. | 62/500 |
| 7,178,359 B2 | 2/2007 | Oshitani et al. | |
| 2005/0268644 A1 | 12/2005 | Oshitani et al. | |
| 2007/0000262 A1 * | 1/2007 | Ikegami et al. | 62/170 |

* cited by examiner

*Primary Examiner*—Melvin Jones
(74) *Attorney, Agent, or Firm*—Harness, Dickey & Pierce, PLC

(57) ABSTRACT

In a refrigerant cycle device, a radiator has a heat radiating portion for radiating high-pressure refrigerant discharged from a compressor and a refrigerant outlet downstream from the heat radiating portion, an ejector includes a nozzle portion for decompressing and expanding refrigerant and a refrigerant suction port for sucking refrigerant by high-velocity refrigerant flow jetted from the nozzle portion. The refrigerant cycle device includes a throttle unit for decompressing refrigerant flowing out of the refrigerant outlet of the radiator, an evaporator located between a refrigerant downstream side of the throttle unit and the refrigerant suction port of the ejector, and a branch portion located within the heat radiating portion of the radiator to branch a refrigerant flow. In the refrigerant cycle device, the nozzle portion has a nozzle inlet coupled to the branch portion so that refrigerant flows into the nozzle inlet from the branch portion of the radiator.

14 Claims, 4 Drawing Sheets

REFRIGERANT CYCLE DEVICE WITH EJECTOR

CROSS REFERENCE TO RELATED APPLICATION

This application is based on Japanese Patent Application No. 2006-219475 filed on Aug. 11, 2006, the contents of which are incorporated herein by reference in its entirety.

FIELD OF THE INVENTION

The present invention relates to a refrigerant cycle device using an ejector as refrigerant decompression and expansion means.

BACKGROUND OF THE INVENTION

JP-A-2005-308380 (corresponding to U.S. Pat. No. 7,178, 359) discloses a refrigerant cycle device in which a branch portion for branching the flow of refrigerant is provided on the upstream side of a nozzle portion of an ejector and on the downstream side of a radiator. A part of the refrigerant branched flows toward the nozzle portion, while the other refrigerant flows toward a refrigerant suction port of the ejector.

In the refrigerant cycle device as disclosed in JP-A-2005-308380, a first evaporator is disposed on the downstream side of a diffuser of the ejector, and a throttle mechanism and a second evaporator are disposed in a branch passage for connecting the branch portion with the refrigerant suction port. Both evaporators allow the refrigerant to obtain the effect of heat absorption.

However, the ejector to be applied to such a refrigerant cycle device expands the refrigerant isotropically at the nozzle portion, thereby recovering the loss of kinetic energy in expansion. This energy recovered (hereinafter referred to as "recovered energy") is converted into pressure energy by the diffuser so as to decrease a driving force of a compressor, thereby improving a cycle efficiency (COP) of the refrigerant cycle device.

An ejector efficiency $\eta e$ indicative of energy conversion efficiency of the ejector is defined by the following formula (1):

$$\eta e = (1 + Ge/Gnoz) \times (\Delta P/\rho)/\Delta H \qquad (1)$$

wherein Ge is the flow rate of the refrigerant sucked from the refrigerant suction port of the ejector, Gnoz is the flow rate of the refrigerant passing through the nozzle portion of the ejector, $\Delta P$ is the amount of an increase in pressure by the diffuser of the ejector, $\rho$ is the density of the refrigerant sucked from the refrigerant suction port, and $\Delta H$ is a difference in enthalpy between an inlet and an outlet of the nozzle portion.

Even if the dimension, shape, and the like of each component of the ejector are designed such that the ejector efficiency $\eta e$ becomes a desired value, as represented by the above-mentioned formula (1), the absolute amount of $\Delta P/\rho$, which is an index representing the pressure energy converted by the diffuser, cannot be increased unless the absolute amount of the enthalpy difference $\Delta H$, which is an index representing the recovered energy by the nozzle portion, is increased.

That is, unless the absolute amount of the enthalpy is increased, the absolute amount of an increase in pressure $\Delta P$ cannot be increased at the predetermined ejector efficiency $\eta e$. Accordingly, it is impossible to enhance the effect of improvement in the cycle efficiency (COP) by the increase in pressure of the refrigerant sucked into the compressor.

SUMMARY OF THE INVENTION

In view of the foregoing problems, it is an object of the present invention to provide a refrigerant cycle device with an ejector, in which recovered energy by a nozzle portion of the ejector is increased, and a pressure increasing amount in a diffuser portion (pressure increasing portion) can be increased.

According to an example of the present invention, a refrigerant cycle device includes: a compressor for sucking and compressing a refrigerant; a radiator having a heat radiating portion for radiating high-pressure refrigerant discharged from the compressor and a refrigerant outlet downstream from the heat radiating portion in a refrigerant flow; an ejector that includes a nozzle portion for decompressing and expanding refrigerant, a refrigerant suction port for sucking refrigerant by high-velocity refrigerant flow jetted from the nozzle portion, and a pressure increasing portion (diffuser portion) in which the high-velocity refrigerant flow and the refrigerant flow sucked from the refrigerant suction port are mixed and the refrigerant pressure is increased by decreasing velocity of the mixed refrigerant flow; a throttle unit for decompressing refrigerant flowing from the refrigerant outlet of the radiator; an evaporator located between a refrigerant downstream side of the throttle unit and the refrigerant suction port, for evaporating the refrigerant from the throttle unit; and a branch portion located in the heat radiating portion for branching a refrigerant flow within the heat radiating portion of the radiator.

Furthermore, the nozzle portion has a nozzle inlet coupled to the branch portion so that the refrigerant branched from the branch portion of the heat radiating portion is introduced into the nozzle inlet. Therefore, the refrigerant with a small heat radiating amount in the radiator flows into the nozzle portion, and it is possible to increase the enthalpy of the refrigerant flowing into the nozzle portion. Thus, in a case where the refrigerant is expanded isotropically in the nozzle portion, the entropy difference of refrigerant between the nozzle inlet and the nozzle outlet is increased as the entropy of the refrigerant on the side of the nozzle inlet becomes higher. Accordingly, the absolute value of the enthalpy difference of the refrigerant between the nozzle inlet and the nozzle outlet is increased, and recovered energy recovered in the nozzle portion can be increased, thereby increasing the pressure increasing amount in the pressure increasing portion.

For example, the heat radiating portion may be positioned between a refrigerant inlet and the refrigerant outlet in the radiator. Alternatively, the radiator may be a condenser for cooling and condensing the refrigerant. In this case, the refrigerant cycle device may further include a high-pressure side vapor-liquid separator for separating the high-pressure refrigerant from the radiator into gas refrigerant and liquid refrigerant, and a super-cooling device for super-cooling the liquid refrigerant from the high-pressure side vapor-liquid separator. In this case, the high-pressure side vapor-liquid separator and the super-cooling device may be located between the refrigerant outlet of the radiator and an upstream side of the throttle unit in a refrigerant flow.

Alternatively, a low-pressure side vapor-liquid separator may be located at a downstream side of the ejector to separate the refrigerant flowing out of the ejector into gas refrigerant and liquid refrigerant. In this case, the low-pressure side vapor-liquid separator may have a gas refrigerant outlet coupled to a refrigerant suction side of the compressor, and the liquid refrigerant separated in the low-pressure side vapor-liquid separator may be supplied to the evaporator at a downstream side of the throttle unit.

According to another example of the present invention, a refrigerant cycle device includes: a compressor for sucking and compressing a refrigerant; a radiator having a heat radiation portion for cooling high-pressure refrigerant discharged from the compressor, a refrigerant inlet from which the refrigerant discharged from the compressor is introduced into the heat radiation portion and a refrigerant outlet from which the refrigerant after passing through the heat radiating portion flows out; an ejector that includes a nozzle portion for decompressing and expanding refrigerant, a refrigerant suction port for sucking refrigerant by high-velocity refrigerant flow jetted from the nozzle portion, and a pressure increasing portion in which the high-velocity refrigerant flow and the refrigerant flow sucked from the refrigerant suction port are mixed and the refrigerant pressure is increased by decreasing velocity of the mixed refrigerant flow; a first refrigerant passage through which the refrigerant from the refrigerant outlet of the radiator flows into the refrigerant suction port of the ejector; a second refrigerant passage having a branch portion located in the refrigerant radiating portion, through which the refrigerant before flowing to the refrigerant outlet of the radiator flows to a nozzle inlet of the nozzle portion; a throttle unit located in the first refrigerant passage, for decompressing refrigerant flowing from the refrigerant outlet of the radiator; and an evaporator located in the first refrigerant passage between a refrigerant downstream side of the throttle unit and the refrigerant suction port, for evaporating the refrigerant from the throttle unit. Accordingly, the refrigerant flowing from the radiator into the nozzle portion has a relatively small heat radiating amount, and it is possible to increase the enthalpy of the refrigerant flowing into the nozzle portion. Thus, in a case where the refrigerant is expanded isotropically, the entropy difference between the nozzle inlet and nozzle outlet is increased as the entropy on the side of the nozzle inlet becomes higher. Accordingly, the absolute value of the enthalpy difference of refrigerant between the nozzle inlet and the nozzle outlet is increased, and recovered energy recovered in the nozzle portion can be increased, thereby increasing the pressure increasing amount in the pressure increasing portion.

For example, the ejector may have an ejector outlet that is coupled to a refrigerant suction port of the compressor. Alternatively, the evaporator may be used as a first evaporator. In this case, a second evaporator for evaporating refrigerant flowing out of the ejector may be provided to have a refrigerant inlet coupled to an outlet of the ejector, and a refrigerant outlet coupled to a refrigerant suction port of the compressor. Alternatively, a low-pressure side vapor-liquid separator may be located at a downstream side of the ejector to separate the refrigerant flowing out of the ejector into gas refrigerant and liquid refrigerant. In this case, the low-pressure side vapor-liquid separator may have a gas refrigerant outlet coupled to a refrigerant suction side of the compressor, and a third refrigerant passage may be provided such that the liquid refrigerant separated in the low-pressure side vapor-liquid separator is supplied to the evaporator positioned at a downstream side of the throttle unit.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
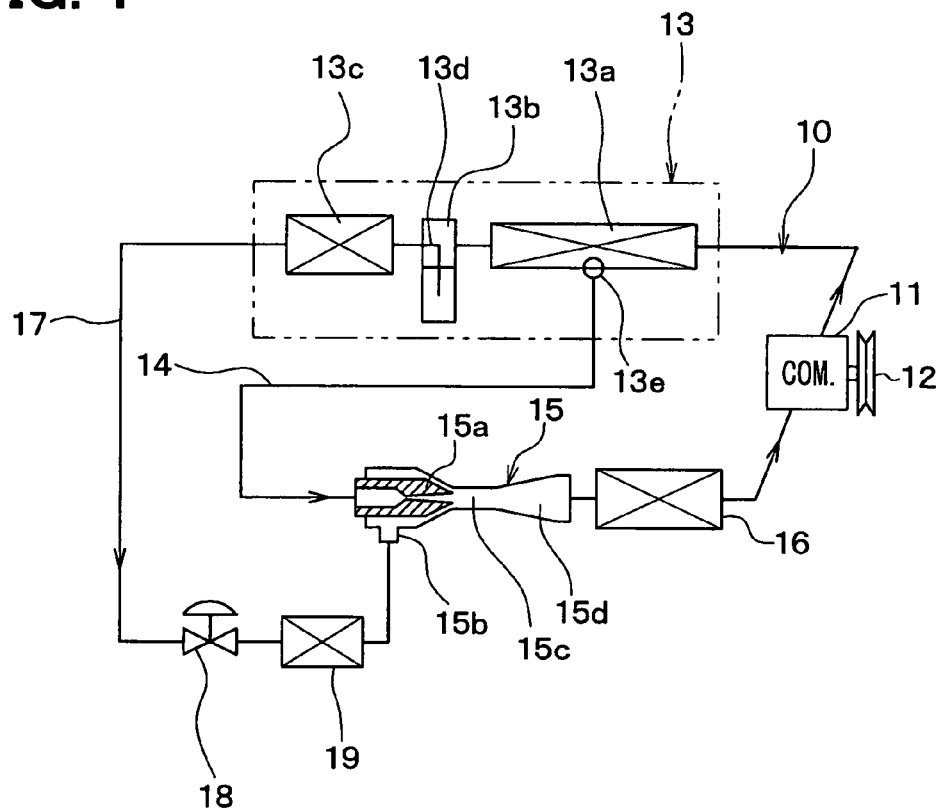
FIG. 1 is a schematic diagram showing a refrigerant cycle device with an ejector, according to a first embodiment of the present invention.

A first embodiment of the present invention will be now described with reference to FIGS. 1 to 3.

In this embodiment, a refrigerant cycle device 10 is constructed of a vapor-compression subcritical cycle using refrigerant whose high pressure does not exceed the critical pressure, such as flon-based or HC-based refrigerant, for example.

In the refrigerant cycle device 10 of this embodiment, a compressor 11 for sucking and compressing the refrigerant is rotatably driven by an engine for vehicle running (not shown) via a pulley 12, a belt, and the like. The compressor 11 for use may be either a variable displacement compressor for being capable of adjusting a refrigerant discharge capacity depending on a change in compression capacity, or a fixed displacement compressor for adjusting a refrigerant discharge capacity by changing an operating efficiency of the compressor by intermittent connection of an electromagnetic clutch. The use of an electric compressor as the compressor 11 can adjust the refrigerant discharge capacity by adjustment of the number of revolutions of an electric motor.

A supercooling device-integrated condenser 13 is disposed as a radiator located on a refrigerant discharge side of the compressor 11. In this example of FIG. 1, the supercooling device-integrated condenser 13 is a subcool condenser, and constructed of a condenser part 13a, a vapor-liquid separator 13b, and a supercooling device 13c, which are integrally formed as one assembly structure.

The condenser part 13a cools and condenses the high-pressure vapor-phase refrigerant discharged from the compressor 11 by using external air (i.e., air outside a compartment of a vehicle) blown by a cooling fan. The vapor-liquid separator 13b, which is connected to the outlet of the condenser part 13a, separates the refrigerant at the outlet of the condenser part 13a into vapor and liquid phases to hold therein the liquid-phase refrigerant. This liquid-phase refrigerant, that is, the saturated liquid refrigerant flows out to the downstream side. The supercooling device 13c cools the saturated liquid refrigerant flowing from the vapor-liquid separator 13b by the external air (i.e., air outside the vehicle compartment), which is blown by a cooling fan (not shown), thereby the refrigerant is supercooled.

In this embodiment, a branch portion 13e for branching the refrigerant flow is set in a radiation section of the condenser part 13a for radiating heat from the refrigerant. The branch portion 13e is connected to a refrigerant inflow side of a nozzle portion 15 of an ejector 15 to be described later via a refrigerant passage 14.

Figure 2A:
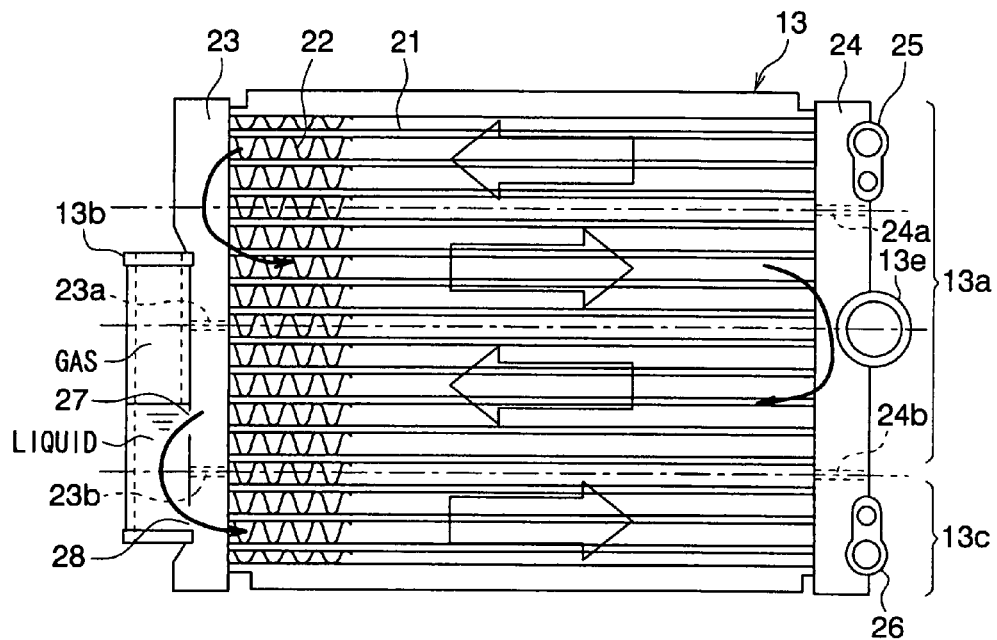
FIG. 2A and FIG. 2B are schematic sectional views showing examples of a supercooling device-integrated condenser of the refrigerant cycle device in FIG. 1.
Figure 2B:
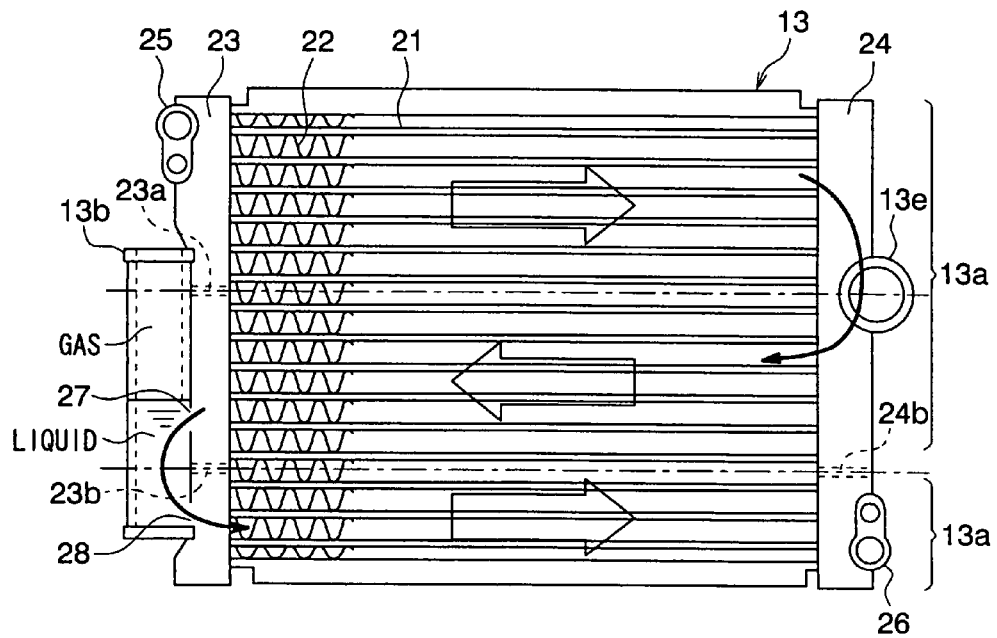

FIGS. 2A and 2B are respectively schematic diagrams showing first and second examples of the supercooling device-integrated condenser 13 in FIG. 1. In FIGS. 2A and 2B, the same reference numbers are given to the components having the same functions.

The supercooling device-integrated condenser 13 is of a multi-flow type for allowing the refrigerant to simultaneously flow through a plurality of tubes disposed between tanks on both ends. An S-shaped turn type having the refrigerant flow in the S-shaped form in the condenser part 13a can be employed as shown in FIG. 2A. Alternatively, a U-shaped turn type having the refrigerant flow in the U-shaped form in the condenser part 13a can be employed as shown in FIG. 2B.

Specifically, the supercooling device-integrated condenser 13 shown in FIG. 2A includes a plurality of tubes 21 laminated in parallel with a predetermined space therebetween, fins 22 disposed between these tubes 21, and first and second tanks 23 and 24 provided on both ends in the longitudinal direction of the tubes 21.

The tube 21 constitutes a flow path through which the refrigerant flows. The fin 22 is provided on the outer wall surface of each tube 21, and promotes heat exchange between air flowing outside the tube 21 and the refrigerant flowing in the tube 21. As the fin 22 can be used a corrugated fin having a wave-shaped section in the direction of air flow. In the supercooling device-integrated condenser 13, areas where the heat exchange is performed between air passing through surrounding areas of the tubes 21 and the refrigerant flowing through the tubes 21 are radiation sections, that is, refrigerant cooling sections. The first and second tanks 23 and 24 distribute and collect the refrigerant flowing through each tube 21.

The supercooling device-integrated condenser 13 shown in FIG. 2A has a refrigerant inlet 25 and a refrigerant outlet 26 thereof disposed on upper and lower end portions of the second tank 24, which is illustrated on the right side of FIG. 2A, respectively. Separators 23a and 24a for allowing the refrigerant to flow inside the condenser part 13a in the S-shaped form, and separators 23b and 24b for separating the integrated condenser 13 into the condenser part 13a and the supercooling device 13c are provided inside the first and second tanks 23 and 24, respectively. The vapor-liquid separator 13b is provided on a lower side area of the first tank 23. A refrigerant outlet 27 of the condenser part 13a is provided in the first tank 23 on a side of the condenser part 13a, and a refrigerant inlet 28 of the supercooling device 13c is provided in the first tank 23 on a side of the supercooling device 13c.

Thus, as indicated by the arrows in FIG. 2A, the refrigerant flows from the refrigerant inlet 25 into the second tank 24, directed inside the tubes 21 in the left direction shown in the figure, and then flows into the first tank 23. Then, the refrigerant flows inside the tubes 21 in the right direction shown in the figure, and flows into the second tank 24. Again, the refrigerant flows inside the tubes 21 in the left direction shown in the figure, and flows into the first tank 23. Then, the refrigerant flows from the refrigerant outlet 27 of the condenser part 13a through the vapor-liquid separator 13b into the refrigerant inlet 28 of the supercooling device 13c. The refrigerant flows through the supercooling device 13c in the right direction shown in the figure, and then out of the refrigerant outlet 26.

The supercooling device-integrated condenser 13 shown in FIG. 2A has the branch portion 13e disposed at the second tank 24 on the side of the condenser part 13a. Thus, in the condenser part 13a of the supercooling device-integrated condenser 13, a part of the refrigerant having entered the refrigerant inlet 25 flows from the branch portion 13e before reaching the refrigerant outlet 27 of the condenser part 13a.

The supercooling device-integrated condenser 13 shown in FIG. 2B is modified with respect to the supercooling device-integrated condenser 13 shown in FIG. 2A in that the refrigerant inlet 25 of the condenser part 13a is located in the first tank 23, and the separator 24a is not provided inside the second tank 24, thereby allowing the refrigerant to flow in the U-shaped form inside the condenser part 13a. Also, in the supercooling device-integrated condenser 13 shown in FIG. 2B, the branch portion 13e is provided at the second tank 24 on the side of the condenser part 13a.

In this way, the branch portion 13e for branching the refrigerant flow is provided at the midpoint of the refrigerant flow path between the refrigerant inlet 25 and the refrigerant outlet 27 in the condenser part 13a. Thus, the refrigerant flowing from the branch portion 13e has a small amount of heat dissipation as compared to the refrigerant flowing from the refrigerant outlet 27 of the condenser part 13a. In the multi-flow type supercooling device-integrated condenser 13 in which the branch portion is provided at the tank as shown in FIGS. 2A and 2B, changing the number of turns of the refrigerant flow can change the position of the branch portion with respect to the refrigerant cooling section. The position of the branch portion with respect to the refrigerant cooling section may be set such that the degree of dryness becomes a desired one in some state of the refrigerant at the branch portion, for example, in a vapor-liquid two-phase state or a vapor-phase state.

The refrigerant passage 14 branching from the branch portion 13e is connected to the inlet side of the nozzle portion of the ejector 15. The ejector 15 serves as decompression means for decompressing the refrigerant, and also as refrigerant circulation means (kinetic vacuum pump) for circulating the refrigerant by a suction effect of the refrigerant flow ejected at high velocity.

The ejector 15 includes a nozzle portion 15a for decompressing and expanding the high-pressure refrigerant substantially isotropically by reducing a passage area of the high-pressure refrigerant (high-pressure saturated refrigerant) flowing from the refrigerant passage 14 to a small level. The ejector 15 also includes a refrigerant suction port 15b located in communication with a refrigerant jet port of the nozzle portion 15a. Through the refrigerant suction port 15b, the refrigerant (vapor-phase refrigerant) is drawn into the ejector 15 from an outlet of a second evaporator 19 to be described later.

Furthermore, in the ejector 15, on the downstream side of the nozzle portion 15a and the refrigerant suction port 15b, a mixing portion 15c is provided for mixing the high-velocity refrigerant flow from the nozzle portion 15a and the suction refrigerant sucked from the refrigerant suction port 15b. A diffuser 15d serving as a pressure-increasing portion is disposed on the downstream side of the mixing portion 15c. The diffuser 15d is formed in such a shape that gradually enlarges the passage area of the refrigerant, and performs a function of decelerating the refrigerant flow to increase the refrigerant pressure, that is, a function of converting velocity energy of the refrigerant into pressure energy. A first evaporator 16 is connected to the outlet side of the diffuser 15d of the ejector 15, and the outlet of the first evaporator 16 is connected to the suction side of the compressor 11, as shown in FIG. 1.

On the other hand, the downstream side of the supercooling device 13c is connected to the refrigerant suction port 15b of the ejector 15 via a refrigerant passage 17. A throttle mechanism 18 is provided in the refrigerant passage 17, and the second evaporator 19 is disposed on the downstream side of the throttle mechanism 18.

The throttle mechanism 18 is decompression means for adjusting a flow rate of the refrigerant flowing into the second evaporator 19, and can be constructed of a fixed throttle, such as a capillary tube or an orifice, for example. Alternatively, the throttle mechanism 18 may be constructed of a variable throttle which changes a degree of opening of the passage (passage area) according to the temperature and pressure of the refrigerant at the second evaporator 19. The variable throttle may be an electric control valve capable of adjusting the passage throttle opening degree (valve opening degree) using an electric actuator.

In the embodiment, the first evaporator 16 and the second evaporator 19 are adapted to cool respective individual spaces to be cooled. For example, the first evaporator 16 is used for cooling the air to be blown into the vehicle compartment. The air is blown by an electric blower (not shown), and is cooled by the first evaporator 16. The cooled air (cool air) is blown into the vehicle compartment so as to cool the interior of the vehicle. On the other hand, the second evaporator 19 is used for cooling the inside of a vehicle-mounted refrigerator. Thus, the air within the refrigerator blown by an electric blower (not shown) is cooled by the second evaporator 19, and the cooled air is circulated again in the refrigerator thereby to cool the inside of the refrigerator. It is noted that the first evaporator 16 and the second evaporator 19 (that is, a combined unit of the first and second evaporators 16 and 19) may be combined into one cooling unit, which may cool one common space to be cooled.

Now, an operation of the refrigerant cycle device 10 according to the first embodiment will be described below in detail. When the compressor 11 is driven by a vehicle engine, the high-pressure and high-temperature vapor-phase refrigerant compressed and discharged by the compressor 11 first flows into the condenser part 13a in the supercooling device-integrated condenser 13.

The condenser part 13a cools and condenses the high-temperature and high-pressure vapor-phase refrigerant by the external air (i.e., air outside the vehicle compartment) blown by the cooling fan. At this time, a part of the refrigerant flows from the branching portion 13e into the nozzle portion 15a, while the refrigerant flowing out of the refrigerant outlet of the condenser part 13a flows into the vapor-liquid separator 13b.

The vapor-liquid separator 13b separates the refrigerant cooled and condensed by the condenser part 13a into vapor and liquid phases. In other words, the refrigerant is separated into the vapor-phase refrigerant on the upper side of the interior space of the vapor-liquid separator 13b and the liquid-phase refrigerant on the lower side thereof, using a difference in density between the vapor-phase and liquid-phase refrigerants. The vapor-liquid interface of the refrigerant is formed in the interior space of the vapor-liquid separator 13b, so that the saturated vapor-phase refrigerant and the saturated liquid-phase refrigerant exist together.

The vapor-liquid separator 13b is provided with a liquid-phase refrigerant outlet passage 13d for taking out the saturated liquid-phase refrigerant. The saturated liquid-phase refrigerant flows into the supercooling device 13c via the liquid-phase refrigerant outlet passage 13d thereby to be supercooled. That is, the supercooling device 13c cools the saturated liquid-phase refrigerant flowing from the vapor-liquid separator 13b by the external air (i.e., air outside the vehicle compartment) blown by the cooling fan (not shown), so that the refrigerant is supercooled. The supercooled liquid-phase refrigerant having passed through the supercooling device 13c flows through the refrigerant passage 17 into the throttle mechanism 18.

The refrigerant flowing into the nozzle portion 15a of the ejector 15 is decompressed and expanded by the nozzle portion 15a. Thus, the pressure energy of the refrigerant is converted into the velocity energy at the nozzle portion 15a, so that the refrigerant is ejected at high velocity from the jet port of the nozzle portion 15a. At this time, the refrigerant (vapor-phase refrigerant) having passed through the second evaporator 19 is drawn from the refrigerant suction port 15b by the jet flow of the refrigerant ejected from the jet port of the nozzle portion 15a.

The refrigerant ejected from the nozzle portion 15a and the refrigerant sucked into the refrigerant suction port 15b are mixed by the mixing portion 15c on the downstream side of the nozzle portion 15a to flow into the diffuser 15d in the ejector 15. The diffuser 15d enlarges the passage area of the refrigerant to decelerate the refrigerant velocity, thereby increasing the refrigerant pressure.

On the other hand, the supercooled liquid-phase refrigerant having passed through the supercooling device 13c is decompressed by the throttle mechanism 18 on the refrigerant passage 17 to be in a low-pressure vapor-liquid two-phase state. This low-pressure refrigerant flows into the second evaporator 19. At the second evaporator 19, the refrigerant absorbs heat from the air blown by the electric blower (not shown) to evaporate. The vapor-phase refrigerant having passed through the second evaporator 19 is sucked from the refrigerant suction port 15b into the ejector 15.

The low-pressure vapor-liquid two-phase refrigerant flowing out of the diffuser 15d of the ejector 15 flows into the first evaporator 16. At the first evaporator 16, the low-temperature and low-pressure refrigerant absorbs heat from the air blown by the electric blower (not shown) to evaporate. The refrigerant having passed through the first evaporator 16 is drawn into and compressed again by the compressor 11.

Figure 3:
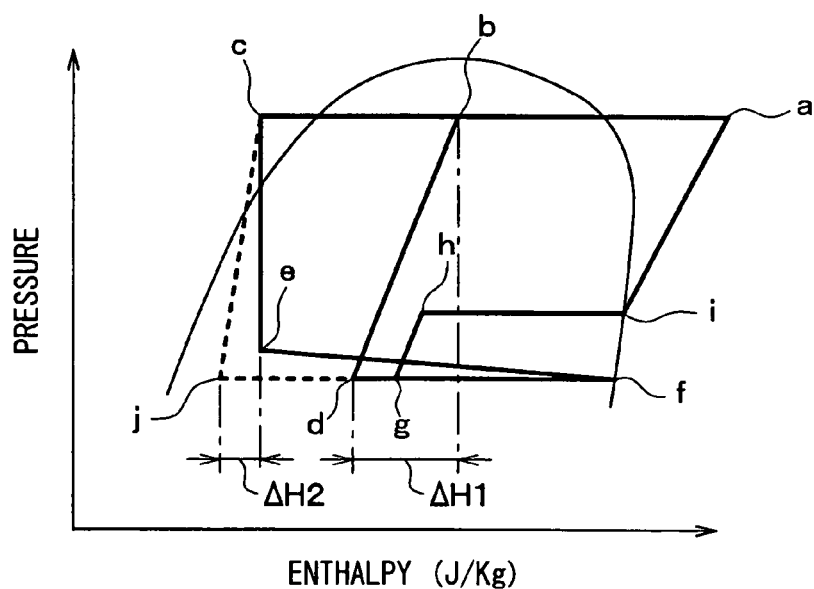
FIG. 3 is a Mollier diagram showing the relationship between the pressure and the Enthalpy of refrigerant in the refrigerant cycle device in FIG. 1.

FIG. 3 shows a Mollier diagram of the refrigerant cycle device 10 shown in FIG. 1.

In the Mollier diagram shown in FIG. 3, the point "a" indicates a state of the discharged refrigerant (high-pressure superheated refrigerant) from the compressor 11, and the point "b" indicates a state of the refrigerant (vapor-liquid two-phase refrigerant) at the branch portion 13e within the condenser part 13a. The point "c" indicates a state of the supercooled liquid-phase refrigerant at the outlet of the supercooling device 13c, and the point "d" indicates a state of the low-pressure vapor-liquid two-phase refrigerant at the outlet of the nozzle portion 15a. The point "e" indicates a state of the low-pressure vapor-liquid two-phase refrigerant at the outlet of the throttle mechanism 18, and the point "f" indicates a state of the refrigerant at the outlet of the second evaporator 19. The point "g" indicates a state of the refrigerant into which the refrigerant sucked from the outlet of the second evaporator 19 and the refrigerant at the outlet of the nozzle portion 15a are mixed. The point "h" indicates a state of the mixed refrigerant whose pressure is increased by the diffuser 15d, and the point "i" indicates a state of the refrigerant at the outlet of the first evaporator 16. It is noted that a difference in enthalpy between the points "e" and "f" corresponds to an amount of absorption of heat at the second evaporator 19, and a difference in enthalpy between the points "h" and "i" corresponds to an amount of absorption of heat at the first evaporator 16.

In the Mollier diagram of FIG. 3, the part indicated by a broken line represents a case of a comparative example in which the branch portion is located on the refrigerant passage 17 positioned on the downstream side of the condenser part 13a and on the downstream side of the supercooling device 13c and is connected to the upstream side of the throttle mechanism 18. In this case, the point "c" indicates a state of the refrigerant at the inlet of the nozzle portion 15a, and the point "j" indicates a state of the refrigerant at the outlet of the nozzle portion 15a. That is, in the comparative example, the supercooled liquid-phase refrigerant at the outlet of the supercooling device 13c is branched into two streams. In this comparative example, one of the supercooled liquid-phase refrigerant streams is decompressed by the nozzle portion 15a of the ejector 15 until the point "J", and the other is decompressed by the throttle mechanism 18 until the point "e".

It is noted that the ΔH1 and ΔH2 of FIG. 3 each indicate a difference between enthalpies of the refrigerants ahead and behind the nozzle portion 15a of the ejector 15, and correspond to expansion loss energy (hereinafter referred to as "recovered energy") recovered by the ejector 15.

Now, the embodiment will be described below in detail as compared with the comparative example.

(1) In the comparative example of FIG. 3, since the supercooled liquid-phase refrigerant supercooled by the supercooling device 13c is decompressed by the nozzle portion 15a of the ejector 15, the decompression characteristic due to an isotropic change at the nozzle portion 15a or the like is shown as one located in the vicinity of a vertical line on the Mollier diagram. This results in a relatively small difference ΔH2 between the enthalpies of the refrigerants ahead and behind the nozzle portion 15a, leading to a small recovered energy.

In contrast, in this embodiment, since the branch portion 13e is provided in the refrigerant cooling section of the condenser 13e, the vapor-liquid two-phase refrigerant located at the point "b", in which a refrigerant cooled amount is smaller than that at the point "c" of FIG. 3, is decompressed by the nozzle portion 15a of the ejector 15. That is, the value of enthalpy of the refrigerant flowing into the nozzle portion 15a at the point "b" is higher than that at the point "c" of FIG. 3.

Thus, as shown in FIG. 3, the decompression characteristic due to an isotropic change at the nozzle portion 15a is shown as one slanted in the direction away from the vertical line on the Mollier diagram as compared to the comparative example. As a result, the difference ΔH1 between the enthalpies of the refrigerants ahead and behind the nozzle portion 15a becomes a relatively large value. That is, the following relationship is obtained: ΔH1>ΔH2.

According to the refrigerant cycle device 10 of this embodiment, the dimension, shape, and the like of each component of the ejector 15 is designed such that the ejector efficiency ηe represented by the above-mentioned formula (1) becomes a desired value. This increases the absolute amount of the difference in enthalpy ΔH, which is an index of the recovered energy by the nozzle portion 15a, thereby increasing the absolute amount of an increase in pressure ΔP at the diffuser 15d.

As a result, the refrigerant cycle device 10 with this arrangement can promote improvement of the cycle efficiency (COP) by an increase in pressure of the refrigerant sucked by the compressor 11, as compared to a refrigerant cycle device in which the branch portion is disposed between the downstream side of the outlet of a radiator and the upstream side of a nozzle portion of the ejector.

(2) In a case where the supercooled liquid-phase refrigerant is decompressed by the nozzle portion 15a of the ejector 15, like the comparative example, most of the liquid-phase refrigerant passes through a throat part of the nozzle portion 15a (a part having the minimum passage diameter), so that the density of the passing refrigerant is large. Thus, in this case, in order to accurately control the amount of refrigerant passing through the nozzle portion 15a, it is necessary to form the throat part of the nozzle portion 15a in the smaller diameter with high accuracy, resulting in an increase in processing costs of the nozzle portion 15a.

In contrast, in this embodiment, because the vapor-liquid two-phase refrigerant passes through the throat part of the nozzle portion 15a (the part having the minimum passage diameter), the density of the refrigerant passing through the throat part of the nozzle portion 15a can be decreased. Thus, the diameter of the throat part of the nozzle portion 15a can be made larger than that in the comparative example, thereby facilitating the processing of the nozzle portion 15a, resulting in reduced processing costs of the nozzle portion 15a.

(3) In this embodiment, the saturated liquid-phase refrigerant from the outlet of the vapor-liquid separator 13b is supercooled by the supercooling device 13c. The supercooled liquid-phase refrigerant is decompressed by the throttle mechanism 18 on the refrigerant passage 17, and then flows into the second evaporator 19. This can enlarge the difference in enthalpy between the inlet and outlet of the second evaporator 19 by a degree of supercooling by the supercooling device 13c, thereby improving the refrigeration capacity of the second evaporator 19.

Second Embodiment

Figure 4:
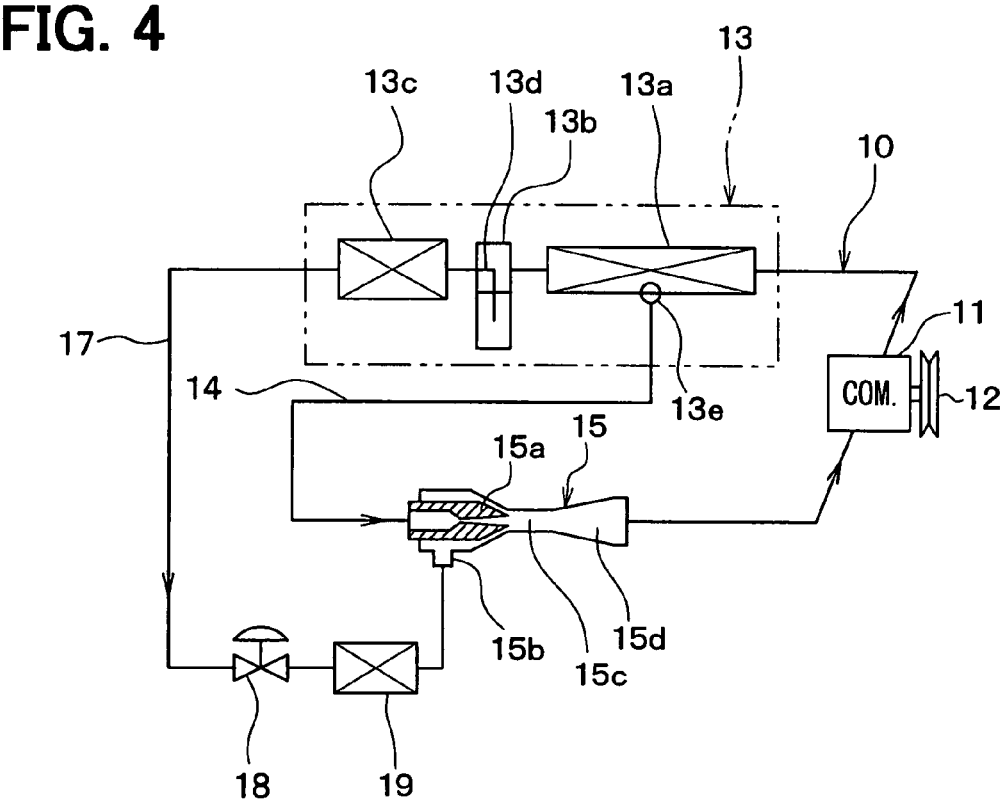
FIG. 4 is a schematic diagram showing a refrigerant cycle device with an ejector, according to a second embodiment of the present invention.

FIG. 4 shows a refrigerant cycle device 10 according to a second embodiment of the invention.

In the refrigerant cycle device 10 of the second embodiment, the first evaporator is withdrawn with respect to the refrigerant cycle device 10 of the first embodiment shown in FIG. 1. Thus, the invention may be applied to the refrigerant cycle device 10 in which one evaporator 19 is located only between the downstream side of the refrigerant flow of the throttle mechanism 18 and the refrigerant suction port 15b of the ejector 15.

In the second embodiment, the other parts of the refrigerant cycle device are similar to those of the above-described first embodiment.

Third Embodiment

Figure 5:
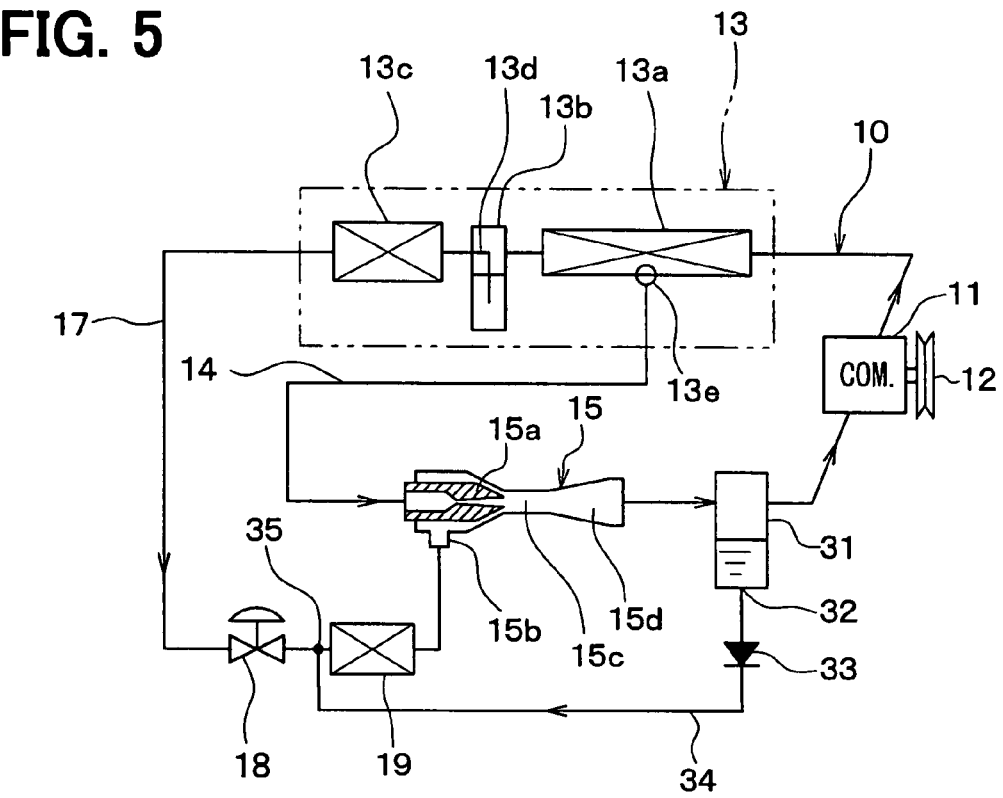
FIG. 5 is a schematic diagram showing a refrigerant cycle device with an ejector, according to a third embodiment of the present invention.

FIG. 5 shows a refrigerant cycle device 10 according to a third embodiment of the invention.

In this embodiment, the first evaporator 16 is withdrawn from the cycle structure of the first embodiment shown in FIG. 1, and instead, a low-pressure side vapor-liquid separator 31 is provided on the downstream side of the ejector 15. This vapor-liquid separator 31 separates the low-pressure refrigerant on the downstream side of the ejector 15 into saturated liquid-phase refrigerant and saturated vapor-phase refrigerant to store therein the saturated liquid-phase refrigerant, while allowing the saturated vapor-phase refrigerant to flow toward the suction side of the compressor 11.

A liquid refrigerant outlet 32 is provided at the bottom of the low-pressure side vapor-liquid separator 31 for taking out the saturated liquid-phase refrigerant. The liquid refrigerant outlet 32 is connected to a refrigerant passage 34 including a check valve 33. The outlet of the refrigerant passage 34 is connected to a join portion 35 between the downstream side of the throttle mechanism 18 and the upstream side of the evaporator 19 in a refrigerant flow. The check valve 33 allows the refrigerant to flow only in one direction from the liquid refrigerant outlet 32 to the join portion 35, thereby preventing a reverse refrigerant flow.

Figure 6:
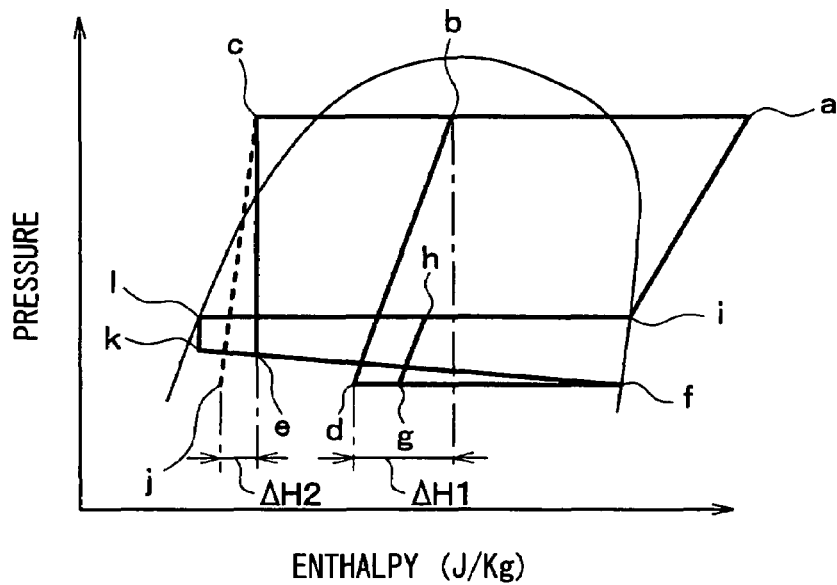
FIG. 6 is a Mollier diagram showing the relationship between the pressure and the Enthalpy of refrigerant in the refrigerant cycle device in FIG. 5.

FIG. 6 shows a Mollier diagram of the refrigerant cycle device 10 according to this embodiment. In the Mollier diagram of FIG. 6, the points "a", "b", "c", "d", "e", "f", "g", "h", and "i" respectively indicate the same respective refrigerant states as those shown in FIG. 3. The point "k" indicates a state of the low-pressure vapor-liquid two-phase refrigerant merged at the join portion 35, and the point "l" indicates a state of the saturated liquid-phase refrigerant inside the low-pressure side vapor-liquid separator 31. The point "i" indicates a state of the saturated vapor-phase refrigerant within the low-pressure side vapor-liquid separator 31. It is noted that a difference in pressure between the points "k" and "l" is the amount of decompression due to a pressure loss of the check valve 33 and the refrigerant passage 34.

Like the third embodiment, the invention may be applied to a refrigerant cycle device which includes the low-pressure side vapor-liquid separator 31 for separating the refrigerant on the downstream side of the ejector 15 into vapor and liquid phases to allow the vapor-phase refrigerant to flow to the suction side of the compressor 11. The refrigerant cycle device also includes the refrigerant passage 34 for supplying the liquid-phase refrigerant separated by the separator 31 to the evaporator 19 on the downstream side of the throttle mechanism 18.

Furthermore, in this embodiment, the low-pressure side vapor-liquid separator 31 is provided for supplying both of the liquid-phase refrigerant separated by the separator 31 and the vapor-liquid two-phase refrigerant after passing through the throttle mechanism 18 to the evaporator 19. Thus, the refrigerant having a high content of liquid phase refrigerant (whose dryness is small) can be constantly supplied stably to the evaporator 19, thereby improving the performance of the evaporator 19.

In the third embodiment, the check valve 33 is provided on the refrigerant passage 34, for allowing the refrigerant to flow only in one direction from the low-pressure side vapor-liquid separator 31 to the evaporator 19, thereby surely preventing the vapor-liquid two-phase refrigerant having passed through the throttle mechanism 18 from directly flowing into the low-pressure side vapor-liquid separator 31.

In the third embodiment, the other parts of the refrigerant cycle device 10 may be similar to those of the refrigerant cycle device 10 of the above-described first embodiment. Furthermore, an evaporator may be further located between the outlet of the ejector 15 and the inlet of the vapor-liquid separator 31.

Other Embodiments

The invention is not limited to the above embodiments, and various modifications can be made to the embodiments described herein as follows.

Figure 7:
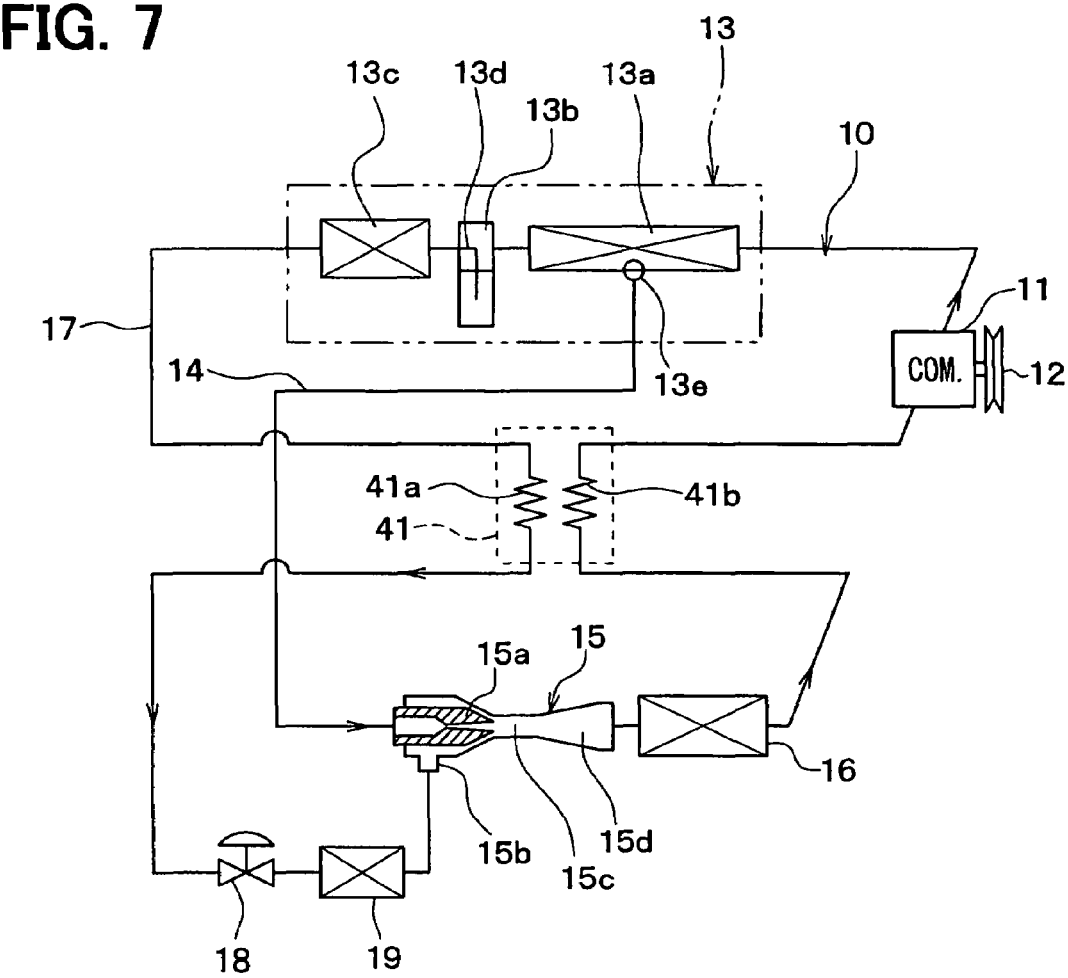
FIG. 7 is a schematic diagram showing a refrigerant cycle device with an ejector, according to a modification example of the present invention.

(1) FIG. 7 shows an another embodiment (modified example) of a refrigerant cycle device 10 of the present invention. The same reference characters are given to the components having the same functions as those of FIG. 1.

In this embodiment of FIG. 7, an inner heat exchanger 41 is added for performing heat exchange between the refrigerant flowing from the downstream side of the refrigerant outlet of the condenser part 13a to the throttle mechanism 18, and the refrigerant flowing from the first evaporator 16 toward the suction side of the compressor 11, with respect to the refrigerant cycle device of the first embodiment shown in FIG. 1. Specifically, a high-pressure side refrigerant passage 41a of the inner heat exchanger 41 is disposed on the downstream side of the supercooling device 13c, and on the upstream side of the throttle mechanism 18. A low-pressure refrigerant passage 41b of the inner heat exchanger 41 is disposed on the upstream side (suction side) of the compressor 11 and on the downstream side of the ejector 15.

In particular, in this embodiment of FIG. 7, the inner heat exchanger 41 exchanges heat between the supercooled liquid-phase refrigerant having passed through the supercooling device 13c after passing through the refrigerant outlet of the condenser part 13a and the low-pressure refrigerant to be sucked into the compressor 11 thereby to cool the high-pressure liquid refrigerant. This can increase a degree of supercooling of the high-pressure liquid refrigerant so as to decrease the enthalpy of the refrigerant at the inlet of the second evaporator 19, as compared with the first embodiment. As a result, the difference in enthalpy of the refrigerant between the inlet and outlet of the second evaporator 19 can be increased thereby to increase the cooling capacity of the second evaporator 19, as compared to the first embodiment.

Unlike the present embodiment, when the high-pressure side refrigerant flow path 41a of the inner heat exchanger 41 is provided on the refrigerant flow path 14 between the branch portion 13e and the nozzle portion 15a, the enthalpy of the refrigerant at the branch portion 13e deviates leftward (toward the decrease of enthalpy) from the point "b" on the Mollier diagram in FIG. 3. This results in decrease in recovered energy at the ejector 15 described in the first embodiment.

In contrast, in this embodiment of FIG. 7, the high-pressure side refrigerant flow path 41a of the inner heat exchanger 41 is provided on the refrigerant flow path 17 between the supercooling device 13c and the refrigerant suction port 15b of the ejector 15, as mentioned above. Thus, the high-pressure refrigerant flowing through the nozzle portion 15a of the ejector 15 is not cooled at the inner heat exchanger 41 and can maintain its enthalpy at the branch portion 13e. This can avoid the decrease in recovered energy at the ejector 15.

The internal heat exchanger 41 may also be provided in the refrigerant cycle device 10 in the second or third embodiment, like this embodiment of FIG. 7.

(2) In the above-mentioned embodiments, a cooling device for the condenser part 13a and the supercooling device 13c is constructed of an air cooling type cooler in which cooling fluid for cooling the refrigerant in the condenser 13 is air (external air), but may be a water cooling type cooler in which cooling fluid is water thereby to cool the refrigerant in the condenser part 13a and the supercooling device 13c.

(3) Alternatively, a cooling device for the condenser part 13a and the supercooling device 13c may be constructed of an absorption type cooler. The absorption type cooler changes a phase (performs evaporation, condensation) of a cooling medium, such as water. Thus, the absorption type cooler can cool the condenser part 13a and the supercooling device 13c using latent heat (evaporation latent heat) of the cooling medium.

(4) Each of the above-mentioned embodiments has described the example which employs the supercooling device-integrated condenser 13 including the vapor-liquid separator 13b and the supercooling device 13c as well as the condenser part 13a as a radiator, but the simple condenser part 13a without the vapor-liquid separator 13b and the supercooling device 13c can also be used.

(5) In each embodiment as described above, electric control valves, such as electric valves for opening and closing respective passages, may be provided in the refrigerant passage 14 on the first evaporator 16 side and in the refrigerant passage 17 on the second evaporator 19 side. This can freely select among the refrigerant flows to the first evaporator 16 and the second evaporator 19. For example, when the throttle mechanism 18 of the refrigerant passage 17 is constructed of the electric control valve, the throttle mechanism 18 itself can also serve as the valve means for opening and closing the passage.

(6) Although each of the above-mentioned embodiments shows an example of the fixed ejector including the nozzle portion 15a having a constant passage area as the ejector 15, a variable ejector having a variable nozzle portion whose passage area is adjustable may be used as the ejector 15.

For example, the variable nozzle portion may be constructed of a mechanism whose passage area is adjusted by inserting a needle into a passage of the variable nozzle portion and by controlling the position of the needle by an electric actuator.

(7) Although each of the above-mentioned embodiments describes the example of the vapor-compression type subcritical cycle using the refrigerant whose high pressure does not exceed the critical pressure, such as flon-based or HC-based refrigerant, the invention is not limited thereto. For example, the invention can be applied in the same way to a vapor-compression type supercritical cycle using refrigerant whose high pressure exceeds the critical pressure, such as carbon dioxide ($CO_2$). In this case, the condenser part 13a acts as the radiator.

(8) The range of applications of the invention is not limited to the refrigerant cycle devices of the above-mentioned respective embodiments, and the invention can be applied to various refrigerant cycle devices having the upstream parts thereof branched. The invention can be applied not only to the refrigerant cycle device for a vehicle, but also to a stationary refrigerant cycle device or the like.

That is, only when the branch portion 13e of the refrigerant passage 14 is located within a heat radiation portion of the radiator 13, the other structures may be suitably changed. The branch structure of invention can be applied to any refrigerant cycle device which includes a compressor for sucking and compressing a refrigerant, a radiator for cooling high-pressure refrigerant discharged from the compressor, and an ejector. Here, the ejector includes a nozzle portion for decompressing and expanding the refrigerant, a refrigerant suction port for sucking refrigerant by high-velocity refrigerant flow jetted from the nozzle portion, and a pressure increasing portion for increasing the refrigerant pressure by decreasing the velocity of the refrigerant flow, into which the high-velocity refrigerant flow and the refrigerant flow sucked from the refrigerant suction port are mixed. Furthermore, the refrigerant cycle device includes a throttle unit for decompressing the refrigerant on the downstream side of the refrigerant flow from the refrigerant outlet of the radiator, and an evaporator connected to between the refrigerant suction port and the refrigerant flow downstream side of the throttle unit, for evaporating the liquid-phase refrigerant.

Such changes and modifications are to be understood as being within the scope of the present invention as defined by the appended claims.

What is claimed is:

1. A refrigerant cycle device comprising:
    a compressor for sucking and compressing a refrigerant;
    a radiator having a heat radiating portion for radiating high-pressure refrigerant discharged from the compressor, and a refrigerant outlet downstream from the heat radiating portion in a refrigerant flow direction;
    an ejector that includes a nozzle portion for decompressing and expanding refrigerant, a refrigerant suction port for sucking refrigerant by high-velocity refrigerant flow jetted from the nozzle portion, and a pressure increasing portion in which the high-velocity refrigerant flow and the refrigerant flow sucked from the refrigerant suction port are mixed and the refrigerant pressure is increased by decreasing velocity of the mixed refrigerant flow;
    a throttle unit for decompressing refrigerant flowing from the refrigerant outlet of the radiator;
    an evaporator located between a refrigerant downstream side of the throttle unit and the refrigerant suction port, for evaporating the refrigerant from the throttle unit; and
    a branch portion located in the heat radiating portion upstream of the refrigerant outlet for branching a refrigerant flow from within the heat radiating portion of the radiator,
    wherein the nozzle portion has a nozzle inlet coupled to the branch portion.

2. The refrigerant cycle device according to claim 1, wherein:
    the radiator has a refrigerant inlet from which the high-pressure refrigerant from the compressor enters to the heat radiation portion; and
    the heat radiating portion is positioned between the refrigerant inlet and the refrigerant outlet.

3. The refrigerant cycle device according to claim 1, wherein the radiator is a condenser for cooling and condensing the refrigerant, the refrigerant cycle device further comprising:
    a high-pressure side vapor-liquid separator for separating the high-pressure refrigerant from the radiator into gas refrigerant and liquid refrigerant; and
    a super-cooling device for super-cooling the liquid refrigerant from the high-pressure side vapor-liquid separator,
    wherein the high-pressure side vapor-liquid separator and the super-cooling device are located between the refrigerant outlet of the radiator and an upstream side of the throttle unit in a refrigerant flow.

4. The refrigerant cycle device according to claim 1, further comprising:
    a low-pressure side vapor-liquid separator located at a downstream side of the ejector to separate the refrigerant flowing out of the ejector into gas refrigerant and liquid refrigerant, the low-pressure side vapor-liquid separator having a gas refrigerant outlet coupled to a refrigerant suction side of the compressor; and
    a refrigerant passage through which the liquid refrigerant separated in the low-pressure side vapor-liquid separator is supplied to the evaporator at a downstream side of the throttle unit.

5. The refrigerant cycle device according to claim 4, further comprising
    a check valve located in the refrigerant passage to allow one way flow of the refrigerant from the low-pressure side vapor-liquid separator to the evaporator.

6. The refrigerant cycle device according to claim 1, wherein the evaporator is used as a first evaporator, the refrigerant cycle device further comprising
    a second evaporator located downstream from the ejector to evaporate the refrigerant flowing out of the ejector.

7. The refrigerant cycle device according to claim 1, further comprising a refrigerant passage through which the refrigerant from the refrigerant outlet of the radiator flows into the refrigerant suction port,
wherein the throttle unit and the evaporator are located in the refrigerant passage.

8. The refrigerant cycle device according to claim 3, wherein the radiator, the high-pressure side vapor-liquid separator and the super-cooling device are formed integrally to construct an integrated unit.

9. A refrigerant cycle device comprising:
a compressor for sucking and compressing a refrigerant;
a radiator having a heat radiation portion for cooling high-pressure refrigerant discharged from the compressor, a refrigerant inlet from which the refrigerant discharged from the compressor is introduced into the heat radiation portion, and a refrigerant outlet from which the refrigerant after passing through the heat radiating portion flows out;
an ejector that includes a nozzle portion for decompressing and expanding refrigerant, a refrigerant suction port for sucking refrigerant by high-velocity refrigerant flow jetted from the nozzle portion, and a pressure increasing portion in which the high-velocity refrigerant flow and the refrigerant flow sucked from the refrigerant suction port are mixed and the refrigerant pressure is increased by decreasing velocity of the mixed refrigerant flow;
a first refrigerant passage through which the refrigerant from the refrigerant outlet of the radiator flows into the refrigerant suction port of the ejector;
a second refrigerant passage having a branch portion located in the refrigerant radiating portion, through which the refrigerant before flowing to the refrigerant outlet of the radiator flows to a nozzle inlet of the nozzle portion;
a throttle unit located in the first refrigerant passage, for decompressing refrigerant flowing from the refrigerant outlet of the radiator; and
an evaporator located in the first refrigerant passage between a refrigerant downstream side of the throttle unit and the refrigerant suction port, for evaporating the refrigerant from the throttle unit.

10. The refrigerant cycle device according to claim 9, wherein the ejector has an ejector outlet that is coupled to a refrigerant suction port of the compressor.

11. The refrigerant cycle device according to claim 9, wherein the evaporator is used as a first evaporator, the refrigerant cycle device further comprising
a second evaporator for evaporating refrigerant flowing out of the ejector, wherein the second evaporator has a refrigerant inlet coupled to an outlet of the ejector, and a refrigerant outlet coupled to a refrigerant suction port of the compressor.

12. The refrigerant cycle device according to claim 9, further comprising:
a low-pressure side vapor-liquid separator located at a downstream side of the ejector to separate the refrigerant flowing out of the ejector into gas refrigerant and liquid refrigerant, the low-pressure side vapor-liquid separator having a gas refrigerant outlet coupled to a refrigerant suction side of the compressor; and
a third refrigerant passage through which the liquid refrigerant separated in the low-pressure side vapor-liquid separator is supplied to the evaporator positioned at a downstream side of the throttle unit.

13. The refrigerant cycle device according to claim 9, further comprising:
a high-pressure side vapor-liquid separator for separating the high-pressure refrigerant from the refrigerant outlet of the radiator into gas refrigerant and liquid refrigerant; and
a super-cooling device for super-cooling the liquid refrigerant from the high-pressure side vapor-liquid separator, wherein the high-pressure side vapor-liquid separator and the super-cooling device are located in the first refrigerant passage between the refrigerant outlet of the radiator and an upstream side of the throttle unit in a refrigerant flow.

14. The refrigerant cycle device according to claim 13, wherein the radiator, the high-pressure side vapor-liquid separator and the super-cooling device are formed integrally to construct an integrated unit.

* * * * *